US006923548B2

United States Patent
Lim

(12) United States Patent
(10) Patent No.: US 6,923,548 B2
(45) Date of Patent: Aug. 2, 2005

(54) BACKLIGHT UNIT IN LIQUID CRYSTAL DISPLAY

(75) Inventor: Moo Jong Lim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/893,558

(22) Filed: Jun. 29, 2001

(65) Prior Publication Data

US 2002/0071288 A1 Jun. 13, 2002

(30) Foreign Application Priority Data

Dec. 13, 2000 (KR) .............................. 2000-76005

(51) Int. Cl.[7] .............................................. F21V 7/04
(52) U.S. Cl. ...................... 362/31; 362/231; 362/800
(58) Field of Search ............................ 362/231, 29, 31, 362/249, 252, 800

(56) References Cited

U.S. PATENT DOCUMENTS

| | | | | |
|---|---|---|---|---|
| 4,521,835 A | * | 6/1985 | Meggs et al. ............... | 362/183 |
| 4,992,704 A | * | 2/1991 | Stinson ...................... | 315/312 |
| 5,143,433 A | * | 9/1992 | Farrell ........................ | 362/29 |
| 5,375,043 A | * | 12/1994 | Tokunaga .................... | 362/31 |
| 5,396,406 A | * | 3/1995 | Ketchpel ..................... | 362/27 |
| 5,803,579 A | * | 9/1998 | Turnbull et al. ............ | 362/516 |
| 5,876,107 A | * | 3/1999 | Parker et al. ................ | 362/31 |
| 5,921,652 A | * | 7/1999 | Parker et al. ................ | 362/31 |
| 6,007,209 A | * | 12/1999 | Pelka .......................... | 362/30 |
| 6,056,420 A | * | 5/2000 | Wilson et al. ............... | 362/249 |
| 6,079,838 A | * | 6/2000 | Parker et al. ................ | 362/31 |
| 6,241,363 B1 | * | 6/2001 | Lee ............................. | 362/231 |
| 6,315,440 B1 | * | 11/2001 | Satoh ......................... | 362/561 |
| 6,335,817 B1 | * | 1/2002 | Phillipps .................... | 359/290 |
| 6,386,720 B1 | * | 5/2002 | Mochizuki .................. | 362/27 |
| 6,404,131 B1 | * | 6/2002 | Kawano et al. .............. | 315/82 |
| 6,411,046 B1 | * | 6/2002 | Muthu ....................... | 315/309 |
| 6,412,968 B1 | * | 7/2002 | Ohkawa ...................... | 362/26 |
| 6,443,597 B1 | * | 9/2002 | Natori ........................ | 362/304 |

* cited by examiner

Primary Examiner—Sandra O'Shea
Assistant Examiner—Jacob Y. Choi
(74) Attorney, Agent, or Firm—McKenna Long & Aldridge LLP

(57) ABSTRACT

A backlight unit in a liquid crystal display enabling to realize high brightness over 2000 nit and provide a thin backlight unit is described. In a backlight unit using LED as a backlight lamp in a field sequence type liquid crystal display including a light-guiding plate, a reflection plate, and a diffusion plate, a plurality of lamps or chips are arranged such that LED chips realizing R, G, and B colors are built in the respective lamps or chips.

22 Claims, 5 Drawing Sheets

1 line
2 line
3 line

| | |
|---|---|
| POl | 31a |
| Sub | 32a |
| Common Electrode | 33 |
| Alignment | 34a |
| LC | 35 |
| Alignment | 34b |
| Pixel | 36 |
| TFT | 37 |
| Sub | 32b |
| POl | 31b |

BACKLIGHT UNIT IN LIQUID CRYSTAL DISPLAY

CROSS REFERENCE

This application claims the benefit of Korean Patent Application No. 2000-76005, filed on Dec. 13, 2000, which is hereby incorporated by reference for all purposes as if fully set forth herein.

BACKGROUND OF THE INVENTION

1. Field of the Invention

The present invention relates to a display apparatus, and more particularly to a backlight unit in a liquid crystal display.

2. Discussion of the Related Art

A liquid crystal display (hereinafter abbreviated LCD) includes a panel part, a driver, and a backlight part, thereby displaying a video by changing molecular arrangement of liquid crystals in the respective pixels by applying electric power to the electrodes installed at both upper and lower glass plates between which a liquid crystal is injected.

Unlike a cathode ray tube (CRT), a plasma display panel (PDP), and a FED, a liquid crystal display cannot be used without an external light because it is non-luminescent. For the purpose of overcoming this weak point and working in the dark, a backlight that applies light uniformly to an information display face of the LCD is used.

Backlights are mainly divided into three categories: (1) a vertical type, in which a lamp irradiates light to a front face from a rear of the liquid crystal display; (2) a side type, in which a lamp is placed at a lateral side of a light-guiding plate through which light is applied to a front face of the LCD; and (3) a wedge type, which is included in the side type, in which a light-guiding plate is slanted.

Reference will now be made to the components and operational principles of the backlight, an example of which is illustrated in the accompanying drawing.

FIG. 1 shows a cross-sectional view of a general side type backlight unit.

Referring to FIG. 1, light emitted from a lamp 11 enters a light-guiding plate 12. In this case, most of the incident light is transferred to the end of the light-guiding plate 12 by total reflection. However, some of the light entering under a specific incident angle, e.g., a direction vertical to a light-guiding plate plane, is not totally reflected, but transmitted through a reflection plate 13 or propagated to a diffusion plate 14.

The reflection plate 13 reflects the light that passes through a rear of the light-guiding plate 12 to the light-guiding plate 12. The light having passed through the light-guiding plate 12 is dispersed, thereby requiring a diffusion plate 14 to provide a uniform brightness of the dispersed light. The brightness of the light having passed through the diffusion plate 14 is then reduced abruptly. In order to increase the reduced brightness, the light is converged by a horizontal/vertical prism sheet 15 so as to propagate into an LCD panel.

A lamp is one of the most important parts of the above-structured backlight unit. There are a number of different lamp types, including EL (electroluminescent) lamps, LEDs (light emitting diodes), CCFL (cold cathode fluorescence lamp) and the like.

Lately, LEDs have drawn attention for use as a backlight of an LCD. An LED operated by the voltage of DC 5V has a life span longer than that of EL or CCFL. In addition, such LED needs no extra inverter. However, an LED requires a current control circuit to protect the LED. Also, an LED placed below an LCD panel generally emits yellow-green color, but can be enabled to apply various colors.

Reference will now be made to the structure of the backlight in detail according to a related art, an example of which is illustrated in the accompanying drawing.

FIG. 2 shows a layout of a lamp in a vertical type backlight unit according to a related art.

Referring to FIG. 2, LED lamps representing R, G, and B (red, green, and blue) colors, respectively, are arranged in order.

A lamp of a vertical type backlight unit applicable to a field sequential LCD having said arrangement is turned on/off by the following sequence.

The lamp is driven by the sequence: 1st line R→2nd line R→3rd line R→1st line G→2nd line G→3rd line G→1st line B→2nd line B→3rd line B.

Unfortunately, LCD according to the related art has the problems as follows.

First, as various LEDs, each of which represents only one color are used in combination, each interval between the lamps having the same color is so far that it is impossible to avoid leaving a long distance between a backlight and a diffusion plate to maintain uniform brightness. Therefore, the backlight unit tends to be thicker.

Second, several diffusion plates are required for reducing the interval between the backlight and diffusion plate. Therefore, brightness of the backlight is reduced by using too many diffusion plates.

Third, circuitry of a printed circuit board (PCB) substrate to which the lamps are fixed becomes complicated.

SUMMARY OF THE INVENTION

Accordingly, the present invention is directed to a backlight unit in a liquid crystal display that substantially obviates one or more of the problems due to limitations and disadvantages of the related art.

An object of the present invention is to provide a backlight unit for an LCD device that provides good brightness and thin thickness.

Another object of the present invention is to provide a backlight unit for an LCd device that reduces the diffusion plates required for an LCD device.

Another object of the present invention is to provide a backlight unit having simplified PCB circuitry.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention as embodied and broadly described, a backlight unit in a liquid crystal display according to the present invention including a light-guiding plate, a reflection plate, and a diffusion plate, wherein the backlight unit uses LEDs as a backlight lamp, wherein the liquid crystal display follows a field sequence, and wherein a plurality of lamps are arranged such that LED chips realizing R, G, and B colors are built in the respective lamps.

In another aspect, a backlight unit in a liquid crystal display according to the present invention includes a light-guiding plate, a reflection plate, and a diffusion plate, wherein the backlight unit uses LEDs as a backlight lamp, wherein the liquid crystal display following a field sequence, and wherein a plurality of chips are arranged such that LED chips realizing R, G, and B colors are built in the respective chips.

In a backlight unit in a field sequence type liquid crystal display including a light-guiding plate, a reflection plate, and a diffusion plate wherein the backlight unit uses LEDs as a backlight lamp, in a further aspect, the backlight unit according to the present invention further includes a plurality of lamps arranged alternatively in a plurality of rows, and three LED chips built in each of the lamps and realizing R, G, and B colors respectively, wherein the lamps are turned on/off according to a sequence of a R chip, a G chip, and a B chip in each of the rows.

In a backlight unit in a field sequence type liquid crystal display including a light-guiding plate, a reflection plate, and a diffusion plate wherein the backlight unit uses LEDs as a backlight lamp, in another aspect, the backlight unit according to the present invention further includes a plurality of chips arranged alternatively in a plurality of rows, and three LED chips built in each of the unit chips and realizing R, G, and B colors respectively, wherein the unit chips are turned on/off according to a sequence of a R chip, a G chip, and a B chip in each of the rows.

An advantage of the present invention is the provision of a backlight unit in a liquid crystal display, in which a single lamp or chip enables R, G, and B colors is provided, thereby improving light efficiency and brightness of the backlight, as well as reducing the thickness of the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
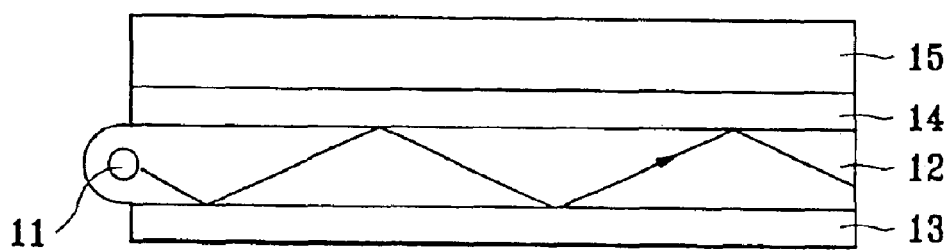
FIG. 1 shows a cross-sectional view of a general side type backlight unit.
Figure 2:
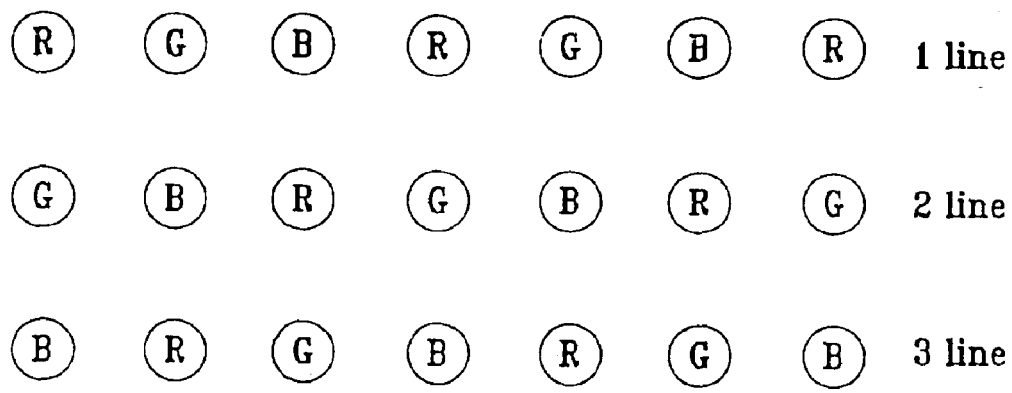
FIG. 2 shows a layout of a lamp in a vertical type backlight unit according to a related art.

Reference will now be made in detail to the preferred embodiments of the present invention, examples of which are illustrated in the accompanying drawings. Where possible, the same reference numerals will be used to illustrate like elements throughout the specification.

A single LED is built inside one lamp or chip in a conventional LED lamp. And, a lamp or a chip having the respective LED chips built-in has been developed. In this case, the respective LED chips enable R, G, and B colors, which are called 3-in-1 type lamps or chips. Compared to the conventional one lamp, the 3-in-1 type lamp or chip provides excellent mixed colors as well as improved brightness.

The present invention relates to a lamp for use in a backlight unit. The backlight unit of the present invention may be used in any of a number of backlight unit configurations, including vertical type, side type and wedge type backlight units.

The LED lamp or chip according to the present invention covers a luminescent area over 100°. In this case, a distance between the respective lamps or chips is designed to be within 10 mm, inclusive, and another distance between an LED lamp (or chip) and a diffusion plate is designed to be within 5 mm, inclusive.

In the present invention, it is intended that the present invention enables high brightness over 2000 nit and provide a thin backlight unit.

Reference will now be made to a backlight unit in detail according to the present invention, an example of which is illustrated in the accompanying drawings.

Figure 3A:
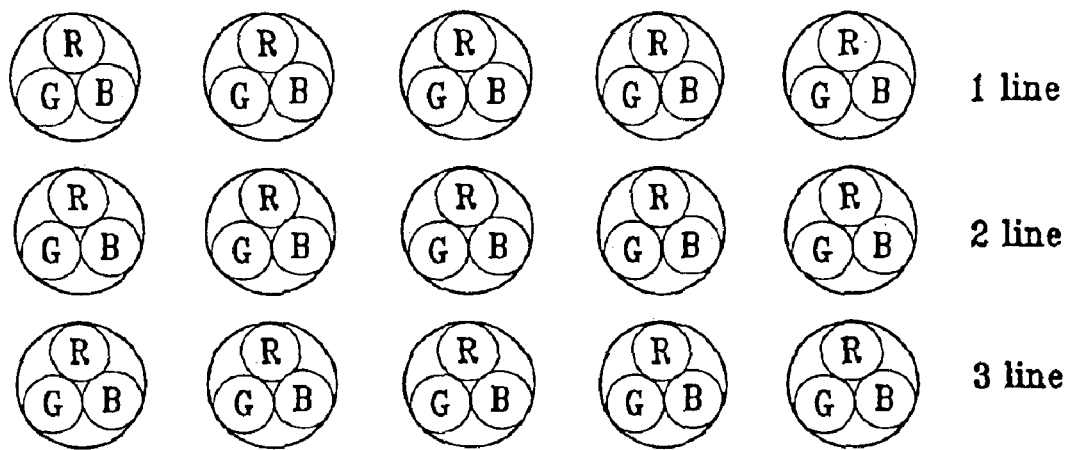
FIG. 3A shows a layout of a lamp in a backlight unit according to a first embodiment of the present invention.

FIG. 3A shows a layout of a lamp in a backlight unit according to a first embodiment of the present invention.

Referring to FIG. 3A, the respective LED chips realizing R, G, and B colors are built in a single chip. And, a plurality of such chips are arranged systematically in order as a matrix form.

A backlight lamp having the above arrangement, when applied to a field sequential LCD, is turned on/off by the following sequence.

The lamp is driven by the sequence: 1st line R→2nd line R→3rd line R→1st line G→2nd line G→3rd line G→1st line B→2nd line B→3rd line B.

The above driving order is as good as that of the related art, but the respective LED chips are built in a single lamp. Compared to the layout of the related art in which each of the lamps realizes only one of R, G, and B colors, the layout of the present invention shows that an interval between the lamps realizing the same color is shorter.

Figure 3B:
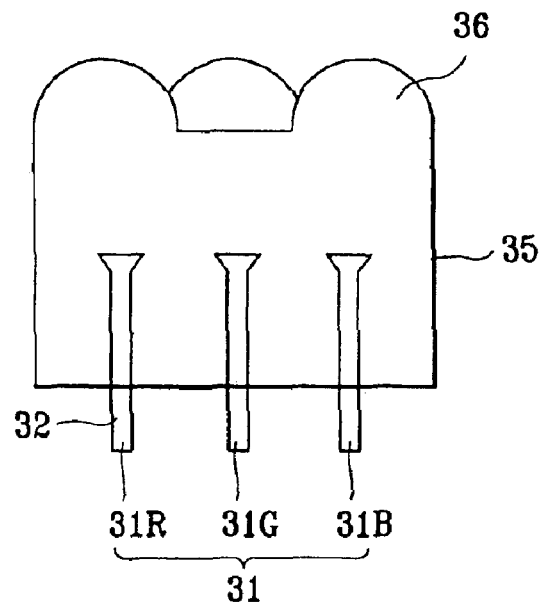
FIG. 3B shows a front view of a unit lamp constructing lamp arrangement of the backlight unit according to a first embodiment of the present invention.

A structure of a unit lamp for the lamp arrangement of the backlight unit according to the first embodiment of the present invention is as follows. FIG. 3B shows a front view of a unit lamp for the lamp arrangement of the backlight unit according to the first embodiment of the present invention.

Referring to FIG. 3B, the respective chips 31R, 31G, and 31B realizing R, G, and B colors are built-in. A lead 32 is connected to the LED chips 31. A mould 35 protects the LED chips 31. And, a lens 36 radiates uniformly light from the respective LED chips 31.

Figure 4A:
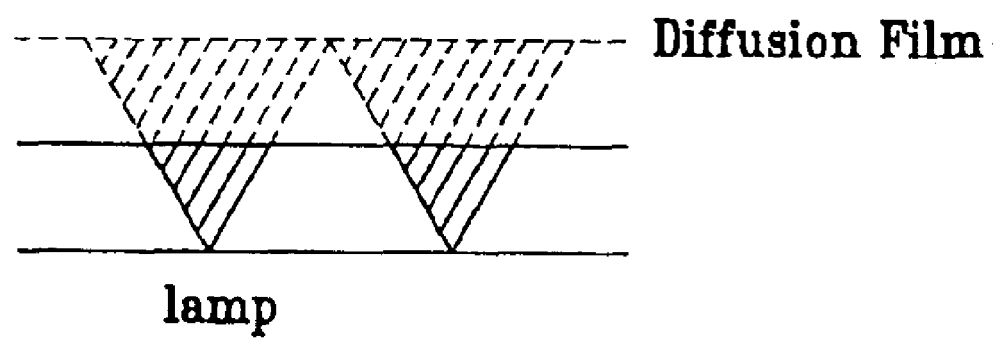
FIG. 4A and FIG. 4B show the relationship between a diffusion plate and a lamp in accordance with a distance between lamps having the same visible angle.
Figure 4B:
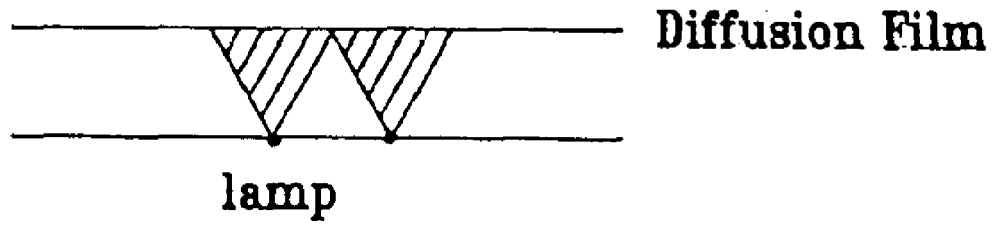

FIG. 4A and FIG. 4B show the relations between a diffusion plate and a lamp in accordance with a distance between lamps having the same visible angle.

Referring to FIG. 4A, the farther the interval between the lamps realizing the same color is, the longer the interval between the lamp and the diffusion plate is. A plurality of diffusion plates are required for shortening the distance between the lamp and diffusion plate, which eventually thickens the backlight unit as well as reduces brightness therefrom.

To the contrary, as shown in FIG. 4B, the closer the interval between the lamps is, the narrower the interval between the lamp and diffusion plate. Therefore, the total thickness of the backlight unit becomes thinner as the interval between the lamp and diffusion plate becomes narrower.

On the other hand, as shown in FIG. 3A and FIG. 3B, a single lamp enables all the colors of R, G, and B. Therefore, compared to that of the method driving the lamps for each color, the constitution of a PCB circuit controlling the lamp is simplified.

Figure 5:
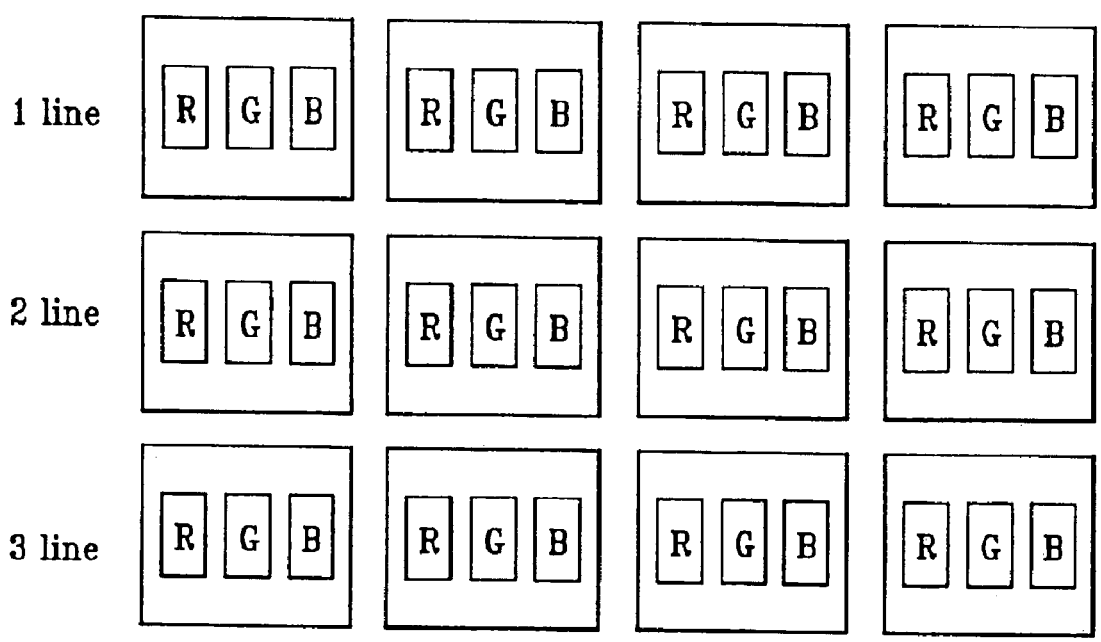
FIG. 5 shows a layout of a backlight unit according to a second embodiment of the present invention.

FIG. 5 shows a layout of a backlight unit according to a second embodiment of the present invention.

Referring to FIG. 5, the respective LED chips realizing R, G, and B colors are built in a single chip. And, a plurality of such chips are arranged systematically in order as a matrix form.

A backlight chip having the above arrangement is turned on/off by the following sequence.

The chip is driven by the sequence: 1st line R→2nd line R→3rd line R→1st line G→2nd line G→3rd line G→1st line B→2nd line B→3rd line B.

Figures 6, 7:
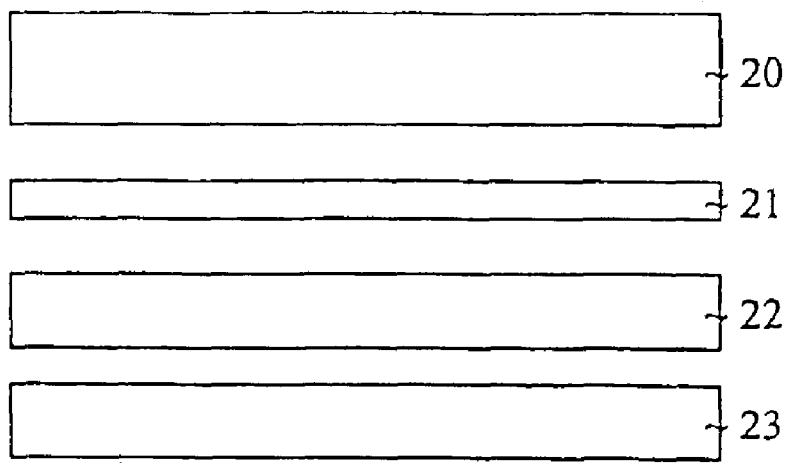
FIG. 6 shows a simplified cross-sectional view of a liquid crystal display panel using a vertical type backlight unit according to the present invention.
FIG. 7 shows a configuration of a liquid crystal display panel for use with a vertical type backlight unit according to the present invention.

As shown in FIG. 6, a backlight lamp according to the present invention may be used in a vertical type backlight unit. In such configuration, a diffuser 21 is adjacent to an LCD panel 20. An LED backlight unit 22 according to the present invention is adjacent to the diffuser 21. A reflector 23 is adjacent to the backlight unit 22 to reflect light escaping from a back side of the backlight unit 22 toward the LCD panel 20.

An example of an LCD panel for use with the LED backlight of the present invention is shown in FIG. 7. As sown in FIG. 7, liquid crystal layer 35 is interposed between two opposing substrates 32a and 32b, the substrates having facing surfaces and external surfaces. A common electrode 33 is formed on the facing surface of the first substrate 32a. An alignment layer 34a is formed on the common electrode 33. A thin film transistor (TFT) 37 is formed on the facing surface of the second substrate 32b. A pixel electrode 36 is formed on the TFT 37, and an alignment layer 34b is formed on the pixel electrode 36. Polarizers 31a and 31b are formed on the external surfaces of the substrates 32a and 32b.

In the first embodiment of the present invention, the LED chips realizing R, G, and B colors respectively are built in a single lamp. Yet, the backlight unit according to the second embodiment of the present invention is characterized that the LED chips realizing R, G, and B colors respectively are built in a single chip instead of lamp. The layout and driving sequence of the second embodiment of the present invention are as good as those of the first embodiment of the present invention.

The backlight lamp according to the present invention may be used in many backlight configurations, including vertical, side and wedge types. In a side-type configuration, the backlight lamp of the present invention may be used on one or a plurality of sides of the LCD panel. Thus, the backlight unit of the present invention may be used in place of a fluorescent side lamp in conjunction with a light-guiding plate.

Accordingly, the backlight unit of an LCD panel of the present invention maintains uniform brightness by having closer intervals between the lamps having the same colors and a shortened distance between the backlight and diffusion plate.

Moreover, the present invention provides high brightness by using a single diffusion plate to guarantee uniform brightness and simplify the circuitry of a PCB substrate controlling a lamp or chip.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a reflection plate;
a diffusion plate having a planar surface; and
a backlight unit using LEDs as a backlight lamp,
wherein a plurality of lamps are arranged such that LED chips realizing R, G, and B colors are built in the respective lamps and wherein the planar surface of the diffusion plate is uniformly and directly exposed to light emitted by the plurality of lamps.

2. The backlight unit in a liquid crystal display of claim 1, wherein each of the lamps has a luminescent area over 100°.

3. The backlight unit in a liquid crystal display of claim 1, wherein the plurality of lamps are within 10 mm of each other.

4. The backlight unit in a liquid crystal display of claim 1, wherein each of the plurality of LED lamps is within 5 mm of the diffusion plate.

5. The backlight unit in a liquid crystal display of claim 1, further comprising a light-guiding plate.

6. The backlight unit in a liquid crystal display of claim 1, wherein the plurality of lamps are arranged between the reflection plate and the diffusion plate.

7. A liquid crystal display device, comprising:
a reflection plate;
a diffusion plate having a planar surface; and
a backlight unit using LEDs as a backlight lamp,
wherein a plurality of unit chips are arranged such that LED chips realizing R, G, and B colors are built in the respective unit chips and wherein the planar surface of the diffusion plate is uniformly and directly exposed to light emitted by the plurality of unit chips.

8. The backlight unit in a liquid crystal display of claim 7, wherein each of the unit chips has a luminescent area over 100°.

9. The backlight unit in a liquid crystal display of claim 7, wherein the plurality of unit chips are within 10 mm of each other.

10. The backlight unit in a liquid crystal display of claim 7, wherein each of the plurality of unit chips is within 5 mm of the diffusion plate.

11. The backlight unit in a liquid crystal display of claim 7, further comprising a light-guiding plate.

12. The backlight unit in a liquid crystal display of claim 7, wherein the plurality of unit chips are arranged between the reflection plate and the diffusion plate.

13. A liquid crystal display device, comprising:
a reflection plate;
a diffusion plate having a planar surface; and
a backlight unit using LEDs as a backlight lamp, the backlight unit further comprising:
a plurality of lamps arranged alternatively in a plurality of rows; and
three LED chips built in each of the lamps, the three LED chips realizing R, G, and B colors respectively, wherein the lamps are turned on/off according to a sequence of a R chip, a G chip, and a B chip in each of the rows and wherein the planar surface of the diffusion plate is uniformly and directly exposed to light emitted by the plurality of lamps.

14. The backlight unit in a liquid crystal display of claim 13, further comprising a light-guiding plate.

15. The backlight unit in a liquid crystal display of claim 13, wherein the plurality of lamps are arranged between the reflection plate and the diffusion plate.

16. A liquid crystal display device, comprising:
   a reflection plate;
   a diffusion plate having a planar surface; and
   a backlight unit using LEDs as a backlight lamp, the backlight unit further comprising:
   a plurality of unit chips arranged alternatively in a plurality of rows; and
   three LED chips built in each of the unit chips, the three LED chips realizing R, G, and B colors respectively,
   wherein the unit chips are turned on/off according to a sequence of a R chip, a G chip, and a B chip in each of the rows and wherein the planar surface of the diffusion plate is uniformly and directly exposed to light emitted by the plurality of unit chips.

17. The backlight unit in a liquid crystal display of claim 16, further comprising a light-guiding plate.

18. The backlight unit in a liquid crystal display of claim 16, wherein the plurality of unit chips are arranged between the reflection plate and the diffusion plate.

19. A liquid crystal display, comprising:
   a reflection plate;
   a first surface of a backlight lamp on the reflection plate, the backlight lamp including a plurality of lamps arranged in a plurality of rows, each of the plurality of lamps including LED chips realizing R, G, and B colors;
   a diffusion plate having a planar surface, wherein the planar surface is on a second surface of the backlight lamp, the first surface opposing the second surface and wherein the planar surface of the diffusion plate is uniformly and directly exposed to light emitted by the plurality of lamps; and
   a liquid crystal display panel on the diffusion plate.

20. The liquid crystal display of claim 19, wherein each of the lamps has a luminescent area over 100°.

21. The liquid crystal display of claim 19, wherein the lamps are within 10 mm of each other.

22. The liquid crystal display of claim 19, wherein the lamps are within 5 mm of the diffusion plate.

* * * * *